US009413234B2

(12) United States Patent
Tomasz et al.

(10) Patent No.: US 9,413,234 B2
(45) Date of Patent: Aug. 9, 2016

(54) SWITCHING REGULATOR SYSTEM WITH LOW POWER OPERATION

(71) Applicant: SILICON LABORATORIES INC., Austin, TX (US)

(72) Inventors: Martin Tomasz, Berkeley, CA (US); Trang Minh Nguyen, Fremont, CA (US)

(73) Assignee: SILICON LABORATORIES INC., Austin, TX (US)

( * ) Notice: Subject to any disclaimer, the term of this patent is extended or adjusted under 35 U.S.C. 154(b) by 69 days.

(21) Appl. No.: 14/308,446

(22) Filed: Jun. 18, 2014

(65) Prior Publication Data

US 2014/0375291 A1 Dec. 25, 2014

Related U.S. Application Data

(60) Provisional application No. 61/837,492, filed on Jun. 20, 2013.

(51) Int. Cl.
*H02M 3/158* (2006.01)
*H02M 3/156* (2006.01)
*H02J 7/34* (2006.01)
*H02M 1/00* (2006.01)

(52) U.S. Cl.
CPC .............. *H02M 3/156* (2013.01); *H02J 7/345* (2013.01); *H02M 2001/009* (2013.01)

(58) Field of Classification Search
CPC ............ H02M 2001/0032; H02M 2001/0083; H02M 2001/009; H02M 3/158; H02M 3/1588; Y02B 70/16
See application file for complete search history.

(56) References Cited

U.S. PATENT DOCUMENTS

| | | | | | |
|---|---|---|---|---|---|
| 4,727,308 A | * | 2/1988 | Huljak | ................ | H02M 3/1588 323/222 |
| 5,414,341 A | * | 5/1995 | Brown | .................... | G05F 1/563 323/259 |
| 5,481,178 A | * | 1/1996 | Wilcox | ................ | H02M 3/156 323/224 |
| 7,859,132 B2 | * | 12/2010 | Chung | ................ | H02H 11/005 307/113 |

(Continued)

OTHER PUBLICATIONS

ST Microelectronics. L6561 "Power Factor Corrector". Jun. 2004. pp. 1-13.*

(Continued)

*Primary Examiner* — Harry Behm
*Assistant Examiner* — Peter Novak
(74) *Attorney, Agent, or Firm* — Gary Stanford; Huffman Law Group, PC (57) ABSTRACT

A regulator controller including terminals for coupling to a voltage source, an inductor and an output capacitor, and including a switching circuit and a switch control circuit. The switching circuit includes switches that toggle coupling of the inductor during switching cycles based on charge and discharge periods. The switch control sets a duration of the charging period based on the input voltage and sets duration of the discharging period based on a difference between the input and output voltages. Multiple output terminals allow coupling to different load types, in which the output terminals may be temporarily coupled together to handle bursted loads. Thus, an output store capacitor may be coupled to handle a bursted load, and then decoupled for charging. Comparator circuits enable/inhibit switching based on input and output conditions. The regulator controller maximizes utilization of weak power sources while sufficiently handling typical load profiles.

24 Claims, 8 Drawing Sheets

(56) References Cited

U.S. PATENT DOCUMENTS

| | | | |
|---|---|---|---|
| 2009/0085535 A1* | 4/2009 | Wei | H02M 3/156 323/272 |
| 2010/0123448 A1* | 5/2010 | Neidorff | H02M 3/1588 323/299 |
| 2012/0155127 A1* | 6/2012 | Brokaw | H02M 1/36 363/49 |
| 2013/0169248 A1* | 7/2013 | Zhang | H02M 3/158 323/271 |

OTHER PUBLICATIONS

Rashid, Muhammad, ed. Power Electronics Handbook. Academic Press. pp. 211-224. 2001.*

* cited by examiner

SWITCHING REGULATOR SYSTEM WITH LOW POWER OPERATION

CROSS-REFERENCE TO RELATED APPLICATIONS

This application claims the benefit of U.S. Provisional Application Ser. No. 61/837,492, filed on Jun. 20, 2013, which is hereby incorporated by reference in its entirety for all intents and purposes.

BACKGROUND OF THE INVENTION

1. Field of the Invention

The present invention relates in general to switching regulator systems, and more particularly to a scalable input current switching regulator system with low quiescent current useful for weak power sources.

2. Description of the Related Art

The load profile of microcontroller-based systems is often characterized by long periods of very low load currents while the microcontroller is in a quiescent, idle state, punctuated by short periods of high load currents when the microcontroller wakes up and controls some activity, such as a brief radio transmission or other higher power operation. Small batteries, solar cells, and other "weak" power sources may be capable of supplying the average load to these systems, but may not be capable of supplying the peak current needed during the periods of high load currents.

Furthermore, some loads in the system may require a higher voltage or a lower voltage than that provided by the input source. A conventional switching regulator may be employed to extract power from the source and provide a useable, regulated voltage, but excessive current may be drawn from the input source during the periods of high load currents. When excessive current is drawn from a battery, a voltage drop through the series impedance of the battery results in wasted power. Small batteries typically maintain the longest life when current is drawn at low levels. Repetitive periods of excessive current generally shortens battery life.

A large output capacitor may be placed at the output of the regulator to buffer the peak loads. A typical switching regulator, however, attempts to recharge the capacitor at an uncontrolled rate, which is usually a high rate, again drawing excessive current from the source. A current limit at the switching output of the regulator does not solve this problem, since the actual current drawn from the source varies as the source voltage varies and the output voltage changes with the charging output capacitor.

Some peripherals in the system, such as a radio or the like, may operate intermittently and require a regulated voltage only during operation. When not operating, however, the peripheral may still draw a small, yet finite unwanted leakage current that may adversely impact battery life. If the regulated voltage is generated by a switching regulator, the switching regulator may be switched off when the peripheral is off in order to remove power from the peripheral to prevent the unwanted leakage current draw. In conventional systems, prior to the peripheral being turning on, the microcontroller had to estimate the time required for the switching regulator to bring up the regulated voltage before allowing the peripheral to turn back on. This activation time was often significant, and variable, constraining the system to be configured to handle the latency and causing significant challenges for providing fast reacting peripherals.

SUMMARY OF INVENTION

A regulator controller according to one embodiment includes input/output (I/O) terminals for coupling to a voltage source, an inductor and an output capacitor. The terminals include an input terminal (developing an input voltage) for coupling to the voltage source and for coupling to a first end of the inductor, an inductor terminal for coupling to a second end of the inductor, and at least one output terminal (developing an output voltage) including a first output terminal for coupling to the output capacitor. The regulator controller further includes a switching circuit coupled to the input terminal and the inductor terminal, where the switching circuit selectively couples the inductor terminal to ground (or other reference node) during a charging period and to the at least one output terminal during a discharging period during a switching cycle. The switch control circuit sets a duration of the charging period based on the input voltage and sets duration of the discharging period based on a difference between the input and output voltages. The charging period may be inversely proportional to the input voltage.

In one embodiment, first and second output terminals are included, in which the regulator controller includes a switch having current terminals coupled between the first output terminal and the second output terminal and which has a control terminal coupled to a detector. The detector controls the switch in response to an activation signal to selectively couple the first and second output terminals together. The detector may be controlled by an external activation signal.

The regulator controller may include a comparator circuit that inhibits switching cycles when the voltage level of the input terminal falls below a predetermined minimum voltage level. The regulator controller may include a comparator circuit that enables the switch control circuit to initiate each switching cycle only when the voltage level of the output terminal falls below a predetermined regulation level.

A peak input current level through the inductor may be determined based on selection of an inductance of the inductor for maximizing utilization of the voltage source. Inductance selection may allow for maximizing battery life when the voltage source is at least one battery.

The regulator controller may include a programmable input for programming an internal feedback voltage divider that enables selection of a regulated voltage level of the output terminal.

The regulator controller may include a discontinuous detection circuit that terminates the switching cycle upon detection of a condition indicative of zero current through the inductor. The zero current condition may be a voltage of the inductor terminal reaching a voltage level of the input terminal.

The regulator controller may include a startup controller coupled to the input terminal for converting power from the input voltage to the switching circuit upon startup, and then that switches to providing power from the first output terminal when the output voltage achieves a predetermined voltage level.

The regulator controller may include a bias circuit coupled to the input terminal and to the switch control circuit in which the switch control circuit is powered solely from the input voltage.

The switch control circuit may include an enable controller and a charging generator. The enable controller initiates switching cycles. The charging generator sets a duration of the charging period based on the input voltage and sets duration of the discharging period based on a difference between the input and output voltages. The charging generator may include a charge pulse generator and a discharge pulse generator. The charge and discharge pulse generators may be enabled to conduct a switching cycle and then disabled to reduce a power state. A bias circuit may be included, in which the charging generator is powered solely from the input voltage. The switching circuit may be powered solely from the output voltage.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

There is a need to efficiently extract power from a "weak" power source, such as a solar cell or a small battery or the like, without drawing excessive currents from the power source. There is also the need to support peak load levels using the same power source. Also, there is a need for a switching regulator to be left "on" to allow for a fast reacting peripheral without wasting power or impacting battery life.

A switching regulator system as described herein operates with an adjustable input current drawn from an input power source in order to maximize the efficiency of the power transfer from the source while accommodating the required output load profile and output storage capacitance. A storage capacitor is provided at the output of the regulator and is scaled to provide sufficient buffered power for bursted loads which may be heavier load than the source is able to directly provide. The adjustable input current level is set to maximize overall battery life when the source is a battery, while providing an acceptable recharging time for the output storage capacitor. The output capacitor is sufficiently charged to ensure that it is prepared to deliver buffered power for the next bursted load. The system may also provide a low input voltage cutoff, below which the regulator idles thus avoiding excessive discharging of the input source, especially when the source exhibits high source impedance during cold temperatures and near end of life.

Furthermore, the switching regulator system may include an output switch. In this case, the output storage capacitor is connected to a load through the switch. The load may be a radio or other intermittent load. In a first state, the switch is open, and the switching regulator maintains the output storage capacitor at a desired voltage. During this state, the switching regulator operates with very low overhead current. Also, when the load is disconnected drawing no power, the switching regulator system ensures that the current drawn from the source is so low that there is little or no impact to the shelf life of the battery. In a second state, the switch is closed, and the load is connected to the output storage capacitor to supply the load instantly with minimum latency.

Figure 1:
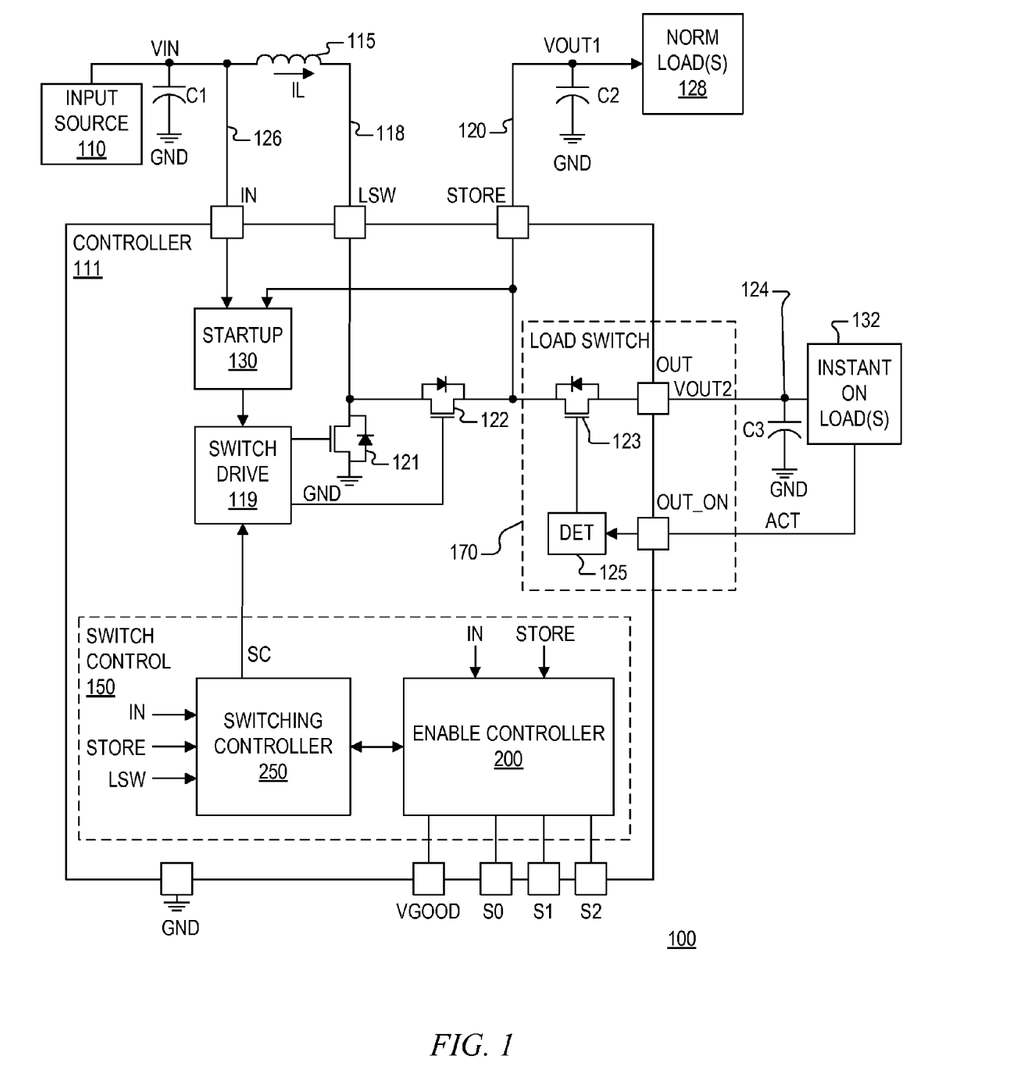
FIG. 1 is a schematic and block diagram of a switching regulator implemented according to one embodiment.

FIG. 1 is a schematic and block diagram of a switching regulator 100 implemented according to one embodiment. The switching regulator 100 is shown including an input source 110, an input capacitor C1, an inductor 115, output capacitors C2 and C3 and a controller 111. An inductor current IL flows through the inductor 115. The controller 111 includes several input/output (I/O) terminals or pins or the like. As shown, the controller 111 includes I/O terminals IN, LSW, STORE, OUT, OUT_ON, VGOOD, S0, S1, S2, and GND. The GND terminal is coupled to a reference voltage level at any suitable reference voltage level, such as ground. In one embodiment, the controller 111 is implemented on an integrated circuit (IC) or semiconductor chip or the like.

In this case, the switching regulator 100 is implemented according to a boost topology, although buck topologies are contemplated as well. The input source 110 provides input power to the system via an input node 126 which develops an input voltage VIN. Input node 126 is coupled to the I/O input terminal IN of the controller 111. An input capacitor C1 is coupled between input node 126 and ground. The input source 110 may be a relatively weak power source, such as one or more solar cells or one or more batteries or the like. For example, the input source 110 may be a battery source which may include one or more small coin cell batteries or the like.

The inductor 115 is coupled between input node 126 and a node 118, which is coupled to the I/O terminal LSW of the controller 111. The LSW terminal of the controller 111 may also be referred to as the inductor terminal for coupling the other end of the inductor 115. The STORE terminal is coupled to an output node 120 which develops a first output voltage VOUT1. The output capacitor C2 is coupled between output node 120 and ground. The OUT terminal is coupled to another output node 124 developing a second output voltage VOUT2. The output capacitor C3 is coupled between node 124 and ground. VOUT1 may be provided to one or more "normal" loads (NORM) 128 which are generally not "bursty" in nature and are usually on (e.g., always on). An example of a normal load is a microcontroller. VOUT2 may be provided to one or more "instant-on" loads 132 or bursty loads that may draw a large level of power for a relatively short time or temporary time period. An example of an instant-on load is a radio that periodically turns on (drawing an instant burst of power) to produce a transmission.

The controller 111 includes a startup circuit 130, a switch drive block 119, a pair of voltage regulation switches 121 and 122, a switch control circuit 150, a load switch 123, and a detector 125. The startup circuit 130 is coupled to the IN and STORE terminals (and the VGOOD terminal in one embodiment) and has an output providing one or more control signals to the switch drive block 119. The switch drive block 119 has outputs coupled to control terminals of the switches 121 and 122. The switches 121-123 may be implemented in any suitable manner, such as field-effect transistors (FETs), MOS transistors, MOSFET transistors, bipolar junction transistors (BJTs), etc. Each switch may be implemented with multiple switches coupled in parallel. Each switch has a control input (such as a gate of a MOS or base of a BJT) and two current terminals, such as drain/source or collector/emitter, etc. The switches 121-123 are depicted as MOS transistors, which may be P-type or P-channel (e.g., PMOS) or N-type or N-channel (e.g., NMOS) or the like.

In one embodiment, switch 121 is an NMOS transistor and switch 122 is a PMOS transistor, although alternative configurations are contemplated. One current terminal of the switch 121 is coupled to ground and its other current terminal is coupled to a current terminal of the switch 122 and to the LSW terminal. The other current terminal of the switch 122 is coupled to a current terminal of the load switch 123, having its other current terminal coupled to the OUT terminal. The detector 125 has an input coupled to the OUT_ON terminal and an output coupled to the control terminal of the load switch 123. The switch control circuit 150 includes an enable controller 200 and a switching controller 250 which are coupled to each other via one or more control signals as further described herein. The switching controller 250 is coupled to the IN, STORE and LSW terminals and the enable controller 200 is coupled to the VSGOOD, S0, S1, S2, IN and STORE terminals. The switching controller 250 outputs one or more switch control signals SC to the switch drive block 119 for controlling switching of the switches 121 and 122.

The detector 125 and the load switch 123 and the terminals OUT and OUT_ON collectively function to enable a load switch circuit 170 for one or more of the loads 132. The capacitor C3 is a filter or bypass capacitor for the load 132. In one embodiment, the capacitor C2 has a significantly larger capacitance than the capacitor C3. In a more specific configuration, the ratio of capacitances between C2 and C3 may be 100:1. A logic activation signal ACT received by the detector 125 via the OUT_ON terminal (or activation terminal) may be used to control the load switch 123 for selectively coupling the output node 120 to the output node 124. The load 132 (or one of the loads 132), such as an "instant-on" load which may be a radio or the like, asserts the ACT signal to the OUT_ON terminal of the controller 111, which is received by the detector 125. The detector 125 responds by turning on the load switch 123 to couple the STORE and OUT terminals together, which effectively couples the capacitor C2 to the output node 124 for additional load capacity for the load 132. The load 132 may then de-assert the ACT signal so that the detector 125 turns off the switch 123 to disconnect the terminals STORE and OUT from each other to allow re-charging of the capacitor C2.

The controller 111 operates with a switching cycle including a charge period $t_{CHARGE}$ and a discharge period $t_{DISCHARGE}$. During the charge period, the switch 121 is turned on to ramp up current through the input inductor 115. During the discharge period, the switch 121 is turned off and the switch 122 is turned on to discharge the inductor current into the output capacitor C2. When the charge and discharge cycles have completed, the switch 122 is turned off for an indefinite or variable off period. In one embodiment, the system operates in discontinuous conduction mode (DCM) in which the inductor current starts and returns to zero during any given switching cycle. The duration of the off period depends upon output load conditions.

The switching cycle timing is governed by the switch control circuit 150. In contrast to conventional regulators, the switch control circuit 150 determines the charge and discharge periods based on the input voltage VIN and output voltage VOUT1 rather than the current through the inductor 115. In this manner, there is no need to measure the current through the inductor 115. As understood by those of ordinary skill in the art, the current through the inductor 115 can be very low and difficult to measure. Inductor current measurement is typically performed using either an undesirably complex low offset current sense amplifier or a lossy sense element which adversely affects efficiency.

The switch control circuit 150 is implemented with a time-voltage constant K, with units of Voltage (V) multiplied by Time in seconds (s), or V*s, and sets the charge period $t_{CHARGE}$ of the switch 121 according to the following equation (1):

$$t_{CHARGE} = \frac{K}{VIN} \quad (1)$$

where VIN is the voltage of the input voltage in Volts (V) developed on the input node 126. The switch control circuit 150 sets of the discharge period $T_{DISCHARGE}$ for turning on the switch 122 according to the following equation (2):

$$t_{DISCHARGE} = \frac{K}{|VOUT1 - VIN|} \quad (2)$$

where VOUT1 is the voltage of the output voltage VOUT1 developed on the output node 120. The absolute value of the difference between the output voltage and the input voltage is based on the fact that VOUT1 is less than VIN at start up and then becomes greater than VIN based on boost operation. The choice of the inductance L of the inductor 115 determines the peak switching current $I_{PK}$ according to the following equation (3):

$$I_{PK} = \frac{VIN \cdot t_{CHARGE}}{L} = \frac{K}{L} \quad (3)$$

When the output is maximally loaded, the averaged input current $I_{IN}(AVG,MAX)$ is determined according to the following equation (4):

$$I_{IN}(AVG, MAX) = \frac{I_{PK}}{2} = \frac{K}{2L} \quad (4)$$

In one embodiment, K is about 2 micro V*s (or 2 μs*V), which, according to the equation (4) for $I_{IN}(AVG,MAX)$, results in a commercially practical inductance L of the inductor 115 of 100 micro-Henries (μH) for 10 milli-amperes (mA) averaged input current when the output VOUT1 is maximally loaded.

$I_{IN}(AVG,MAX)$ may thus be considered an input current limit, limiting the current sourced from input source 110, which may be set by the choice of the inductance L of the inductor 115. When a battery is selected as the input source 100, the inductance L is chosen to set the input current limit appropriately for the capacity and output impedance of the input source 110 to ensure the battery life is maximized. For example, consider the case where the input source 110 is a Lithium battery that may exhibit 10 ohms (Ω) output impedance. The inductance L may be chosen to be 100 µH. In this case, $I_{IN}(AVG,MAX)$ is 10 mA, resulting in a 100 mV loss across the output impedance of the battery while the output capacitor C2 is being charged.

The output voltage VOUT1 is regulated by a comparator in the switch control circuit 150 as further described herein. When a load discharges the capacitor C2 and causes the output voltage VOUT1 to drop below the desired, regulated voltage, switching periods are initiated. When the output voltage VOUT1 is at or above the desired, regulated voltage, the comparator causes the switching periods to stop. Thus, the average input current, $I_{IN}(AVG)$ varies according to the load. However, $I_{IN}(AVG)$ does not exceed $I_{IN}(AVG,MAX)$, which represents the case where switching periods are continuously initiated.

The capacitance of the capacitor C2 and the regulated voltage level of VOUT1 are selected to provide sufficient "burst" current to provide power a load 132 while activated. In one embodiment, the burst current provided to the load 132 is greater than the maximum input current $I_{IN}(AVG,MAX)$. The load 132 is activated only for a temporary period of time, and is then disconnected by turning off the switch 123. The controller 111 then operates to re-charge the capacitor C2 for a subsequent burst event for the same or different load 132. In this manner, the input source 110 is not overly taxed during burst events, and the inductance of the inductor 115 may be chosen to set $I_{IN}(AVG,MAX)$ at a level that maximizes utilization of the input source 110. For example, if the input source 110 includes one or more batteries, then the inductor 115 is chosen to set $I_{IN}(AVG,MAX)$ at a level that maximizes battery life.

Figure 2:
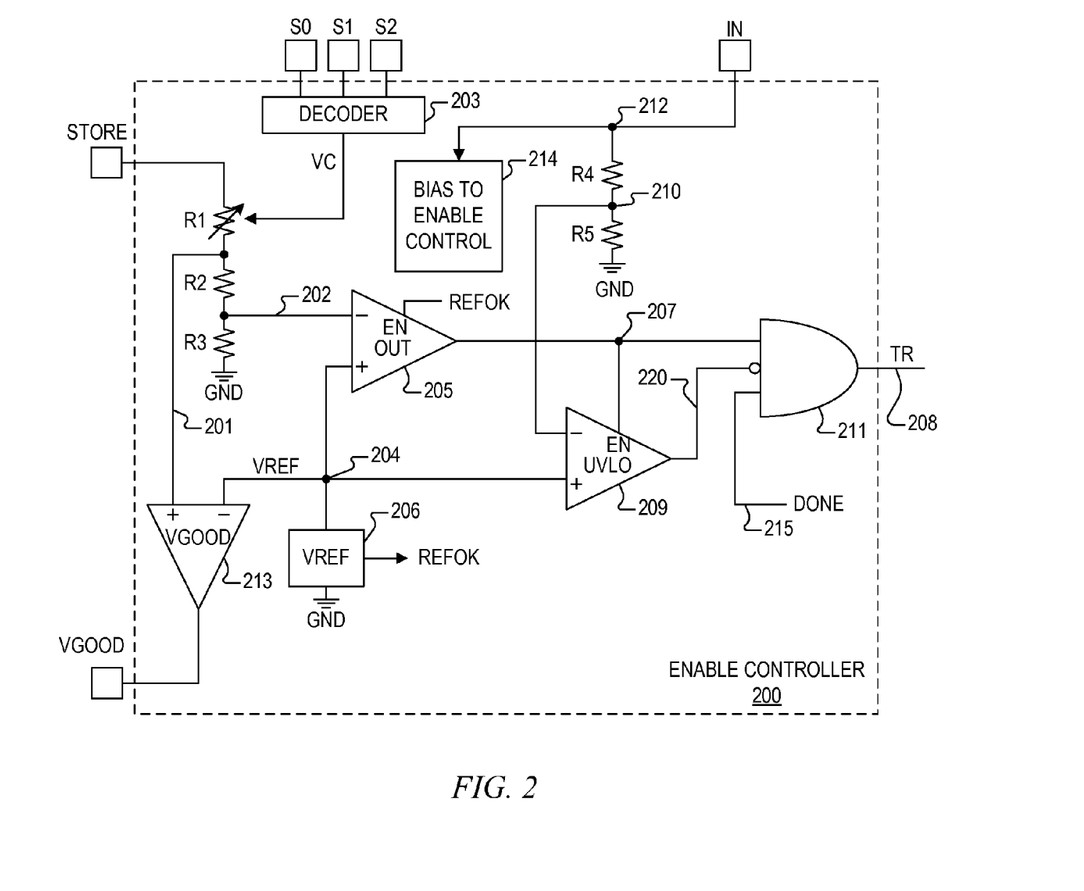
FIG. 2 is a schematic and block diagram of the enable control circuit of the control block of FIG. 1 implemented according to one embodiment.

FIG. 2 is a schematic and block diagram of the enable controller 200 of the switch control circuit 150 implemented according to one embodiment. The enable controller 200 monitors and controls the regulation of the output voltage VOUT1, whereas the switching controller 250 controls the operation of the switches 121 and 122 during the switching cycles.

In the enable controller 200, VOUT1, which is received via the STORE terminal, is internally divided by a resistor divider including resistors R1, R2 and R3 coupled in series between STORE and ground. R1 is coupled between the STORE terminal and a node 201, R2 is coupled between nodes 201 and 202, and R3 is coupled between node 202 and ground. Node 201 is coupled to a positive (or non-inverting) input of a VGOOD comparator 213, having its negative (or inverting) input coupled to a node 204 developing a reference voltage VREF and having an output coupled to the VGOOD terminal. A decoder 203 is coupled to the terminals S0, S1 and S2 and has a voltage control (VC) output provided to a control input of the resistor R1, which is an adjustable or variable resistor.

A reference block 206 is coupled between node 204 and ground and develops VREF on node 204. The reference block 206 is one of the first circuits to be activated or turned on upon power up. When the voltage level of VREF achieves a threshold level relative to its regulated value, it asserts a control signal REFOK indicating that VREF is in regulation. In one embodiment, VREF has a regulated value of about 0.45 V, although any suitable voltage level is contemplated for various embodiments. In one embodiment, the threshold level is about 98% of the regulated value.

An output comparator 205 has its negative input coupled to node 202, its positive input coupled to node 204, its output coupled to a node 207, and an enable input (EN) receiving REFOK. The IN terminal is internally coupled to a node 212, which is further coupled to a BIAS block 214 and to a resistive voltage divider including resistors R4 and R5 coupled in series between node 212 and ground. An intermediate node 210 between resistors R4 and R5 is coupled to a negative input of a UVLO comparator 209, which has its positive input coupled to node 204 and its output coupled to a node 220. Node 207 is coupled to an enable (EN) input of the comparator 209 and to one input of a 3-input AND gate 211. Node 220 is coupled to a second and inverting input of the AND gate 211, which has its third input coupled to a node 215 developing a signal DONE. The signal DONE is developed by the switching controller 250 as further described herein. The output of the AND gate 211 is coupled to a node 208 providing a trigger signal TR to an input of the switching controller 250.

The regulated output voltage VOUT1 on the STORE terminal is divided down by the resistor voltage divider R1-R3 on node 202 and compared to the reference voltage VREF by the output comparator 205. A user choose one of 8 output voltage levels for VOUT1 by applying a logic combination on terminals S0-S2, in which the logic value is decoded by the decoder 203 for determining the resistance of R1. The comparator 205 asserts a regulation signal on node 207 high when VOUT1 drops below the selected voltage level.

The input voltage VIN is developed on node 212 provided via the input terminal IN, which is divided down by the resistor voltage divider R4 and R5 forming a feed forward sense circuit to provide a proportional voltage level on node 210. When enabled, the UVLO comparator 209 compares the voltage of node 210 indicative of the voltage level of VIN with VREF and asserts an under-voltage signal on node 220 high when VIN drops below a predetermined minimum input voltage level. The UVLO threshold is set high enough to ensure that circuitry powered from the input voltage VIN retains sufficient headroom for normal operation. The UVLO comparator 209 inhibits initiation of switching cycles if the voltage of VIN is too low, thus ensuring no switching currents are drawn from the input to collapse the battery voltage.

In operation, the comparator 205 is enabled by REFOK, and when enabled, monitors the voltage level of VOUT1 based on the voltage level of node 202 relative to VREF. When VOUT1 is below its regulation level, the comparator 205 asserts its output high which enables the UVLO comparator 209. It is noted that the output of the UVLO comparator 209 is also only valid when REFOK is asserted. The AND gate 211 asserts TR high on node 208 high to initiate a new switching cycle when VOUT1 is below its regulation level as indicated by the comparator 205, when the input voltage VIN is above the predetermined minimum input voltage level as indicated by the UVLO comparator 209, and when a prior cycle has completed as indicated by DONE being asserted high.

The BIAS block 214 receives the input voltage VIN and distributes power to the circuits of the enable controller 200. The VGOOD comparator 213 monitors the voltage level of the output voltage VOUT1 via node 201 and compares this voltage with VREF. The VGOOD comparator 213 asserts the VGOOD terminal high when VOUT1 has reached or nearly reached a desired regulated voltage level indicated by the voltage level of node 201. Keeping the feedback resistor divider internal to the IC helps reduce quiescent current substantially, because it allows for very large value resistors, such as on the order of 250 Mega-Ohms (MΩ). If the feedback resistor divider were external to the IC, lower value resistors would be required due to the impact of printed circuit board (PCB) parasitic capacitance and leakage due to the electrostatic discharge (ESD) protection diodes (not shown) coupled to the resistor divider feedback I/O terminal.

While the UVLO function performed by the UVLO comparator 209 is shown to have a fixed threshold, a variable threshold may also be implemented. For example, the UVLO threshold may be set based on an estimate of the internal resistance of the input source 110. Or, the UVLO threshold may be set according to a calculated optimum input voltage for which the maximum source power may be extracted, as is known in the art as "MPPT" (maximum power point tracking).

The UVLO function can serve to further enhance the ability of the switching regulator to extract power from a weak source, beyond the feature of the input current limit previously described, by limiting the allowable voltage drop at the input source 110 during the charging of the output capacitor C2. At cold temperatures, for example, the impedance of batteries increases dramatically which reduces the level of the input voltage accordingly. If VIN falls below the threshold level developed on node 210, the UVLO comparator 209 asserts its output high to inhibit switching. Thus the UVLO function can serve as a secondary means to an input current limit, to prevent excessive input voltage drop.

Furthermore, the UVLO comparator 209 may be implemented with a certain level of hysteresis, in which it turns on when node 210 falls to a lower end of the hysteresis window (or hysteresis voltage range), and turns off when node 210 rises to a higher end of the hysteresis window. While switching is inhibited by the UVLO comparator 209, the input source 110 collects charge until it reaches the UVLO rising threshold, and then the UVLO comparator 209 pulls its output low to allow switching to resume. The amount of transferred or accumulated charge is determined by the hysteresis voltage range and the capacitance of the input capacitor C1.

Figure 3:
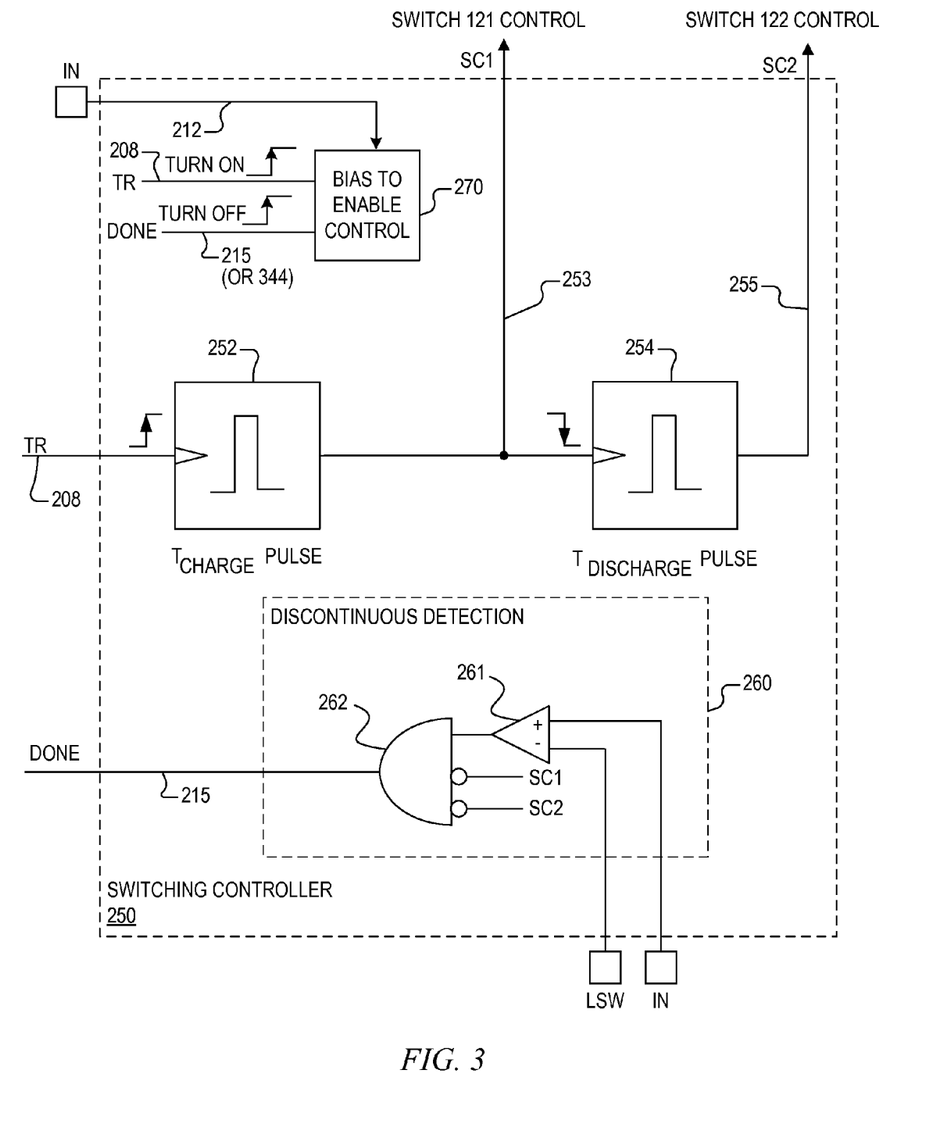
FIG. 3 is a schematic and block diagram of the switching control circuit of the control block of FIG. 1 implemented according to one embodiment.

FIG. 3 is a schematic and block diagram of the switching controller 250 of the switch control circuit 150 implemented according to one embodiment. The enable controller 200 governs the initiation of switching cycles by asserting TR on node 208 high. In the illustrated embodiment, the switching controller 250 includes a charge generator developing a charge pulse and a discharge pulse for controlling switching timing. TR is provided to an input of a TCHARGE pulse generator 252, having an output providing a signal SC1 on a node 253. A rising edge on TR initiates a $t_{CHARGE}$ pulse on SC1 according to equation (1) as previously described. SC1 is provided to the switch drive block 119, which turns on the switch 121 for the duration of the $t_{CHARGE}$ pulse. When the $t_{CHARGE}$ pulse goes low, the switch drive block 119 turns off the switch 121.

SC1 is provided to an input of a TDISCHARGE pulse generator 254, having an output providing a signal SC2 on a node 255. When the $t_{CHARGE}$ pulse goes back low, the falling edge triggers a $t_{DISCHARGE}$ pulse on SC2 according to equation (2) as previously described. SC2 is also provided to the switch drive block 119, which turns off the switch 121 and then turns on the switch 122 for the duration of the $t_{DISCHARGE}$ pulse. Upon completion of the $t_{DISCHARGE}$ pulse, the switch drive block 119 turns off the switch 122.

The duration of the $t_{DISCHARGE}$ pulse may be slightly modified to accommodate delays in a discharge pulse generator within the TDISCHARGE pulse generator 254. A factor M may truncate the pulse width slightly to minimize negative-going currents in inductor 115 which can be caused by excessively long discharge pulse. A negative-going inductor current means that current flows in the direction towards the IN terminal which is undesirable because it is discharging the output capacitor C2. M is chosen to ensure that no negative-going currents flow in inductor 115.

The switching cycle is determined to be done when a discontinuous detection circuit 260 generates a high level on the DONE signal on node 215. The discontinuous detection circuit 260 includes a comparator 261 having a positive input coupled to the IN terminal for sensing VIN, a negative input coupled to the LSW terminal for sensing LSW, and an output coupled to one input of an AND gate 262. Signals SC1 and SC2 are provided to inverting inputs of the AND gate 262, having its output coupled to node 215 providing the DONE signal.

DONE goes high when the following conditions are true: (1) the $t_{CHARGE}$ pulse is completed as indicated by signal SC1 going low, (2) the $t_{DISCHARGE}$ pulse is completed as indicated by signal SC2 going low, and (3) the voltage at the LSW terminal at node 118 has dropped below the input voltage VIN. The comparator 261 compares the voltage of the LSW terminal with VIN (received via the IN terminal) and asserts its output high to indicate that current has stopped flowing in inductor 115 (and thus the resulting voltage across inductor 115 has collapsed).

In an alternative embodiment, the positive input of the comparator 261 may be coupled instead to the STORE terminal for detecting that the current has stopped flowing in inductor 115 when the voltage at terminal LSW has dropped below VOUT1.

Discontinuous detection circuit 260 may instead monitor the voltage at switching node LSW utilizing a window comparator, and detection of when current has stopped flowing in inductor 115 is determined when the voltage at terminal LSW falls within the window of the comparator. The window voltage of the comparator may include, or otherwise be based on, the voltage VIN (at input terminal IN). This implementation has the advantage of removing the possibility of a false detection of zero inductor current in the case that inductor current has begun to flow in the negative direction during the discharge pulse period, from output node 120 to the input node 126, which may occur if the discharge pulse generator (within the TDISCHARGE pulse generator 254) generates an excessively long discharge pulse. In that case, at the end of the discharge pulse, the voltage at the LSW terminal drops to near zero volts, even though current has not stopped flowing in inductor 115.

In the case where the comparator 261 compares VOUT1 (received via the STORE terminal) with the voltage of the LSW terminal, the comparator 261 may incorrectly assert its output high to indicate that current has stopped flowing in inductor 115, though in fact current has not stopped flowing in inductor 115, but rather some current is flowing in the negative direction. It is only when the voltage at terminal LSW ultimately settles at the voltage of VIN (at input terminal IN) when current has truly stopped flowing in inductor 115; thus, this implementation ensures that discontinuous detection circuit 260 detects when the inductor 115 has no current, even if the discharge pulse generator generates an excessively long discharge pulse. In one implementation of the case in which the comparator 261 compares VIN (received via the IN terminal) with the voltage of the LSW terminal, a short blanking period is implemented directly after the discharge period, effectively muting the output of the window comparator to prevent a false assertion that current has stopped flowing in the inductor during the transition of LSW terminal voltage to near zero volts.

The discontinuous detection circuit 260 implements the discontinuous conduction mode (DCM) to ensure that energy in the inductor 115 is completely transferred to the output before initiation of a subsequent cycle. DCM prevents residual inductor current in multiple cycles that might otherwise build to an excessive level to saturate the inductor 115. Also, DCM prevents negative inductor current that would otherwise discharge the capacitor C2, so that DCM improves efficiency by avoiding repetitive charging and discharging of the output capacitor.

The IN terminal receiving the input voltage VIN is further coupled via node 212 to a BIAS block 270, which further detects the voltage of nodes 208 (turn on pulse) and 215 (the DONE signal). In an alternative embodiment, the DONE signal may instead be sensed via a node 344, further described below. The BIAS block 270 receives the input voltage VIN and distributes power to the circuits of the switching controller 250 during the switching periods. Thus, the circuits of the switching controller 250 are only powered on during active switching periods, which is between the time when a rising edge of the TR signal on node 208 initiates a switching cycle (TURN ON), and when a rising edge of the DONE signal on node 215 indicates the completion of a switching cycle (TURN OFF).

Once the output is in regulation, only the output comparator 205, the reference block 206, and the feedback resistor divider R1-R3 of the enable controller 200 are enabled. In another embodiment, the VGOOD comparator 213 may also be enabled. Thus, overall power consumption of the switching regulator 100 is minimized.

Another important distinction relative to conventional boost regulators is that the internal circuitry is powered from the input of the regulator, as opposed to a bootstrapped arrangement from the output (which is typically the case especially with low voltage regulators, in order to maximize circuit operation headroom). For the switching regulator 100, only the switch drive block 119 is powered from the output. In one embodiment, the internal circuitry is designed using low headroom techniques and operates from the minimum expected input voltage. The power savings are substantial, because circuitry operating from the output of the boost regulator gets scaled to the input current as shown by the following equation (5):

$$I_{IN} = \frac{VOUT1}{VIN * \text{EFFICIENCY}} * I_{OUT} \quad (5)$$

Figure 4:
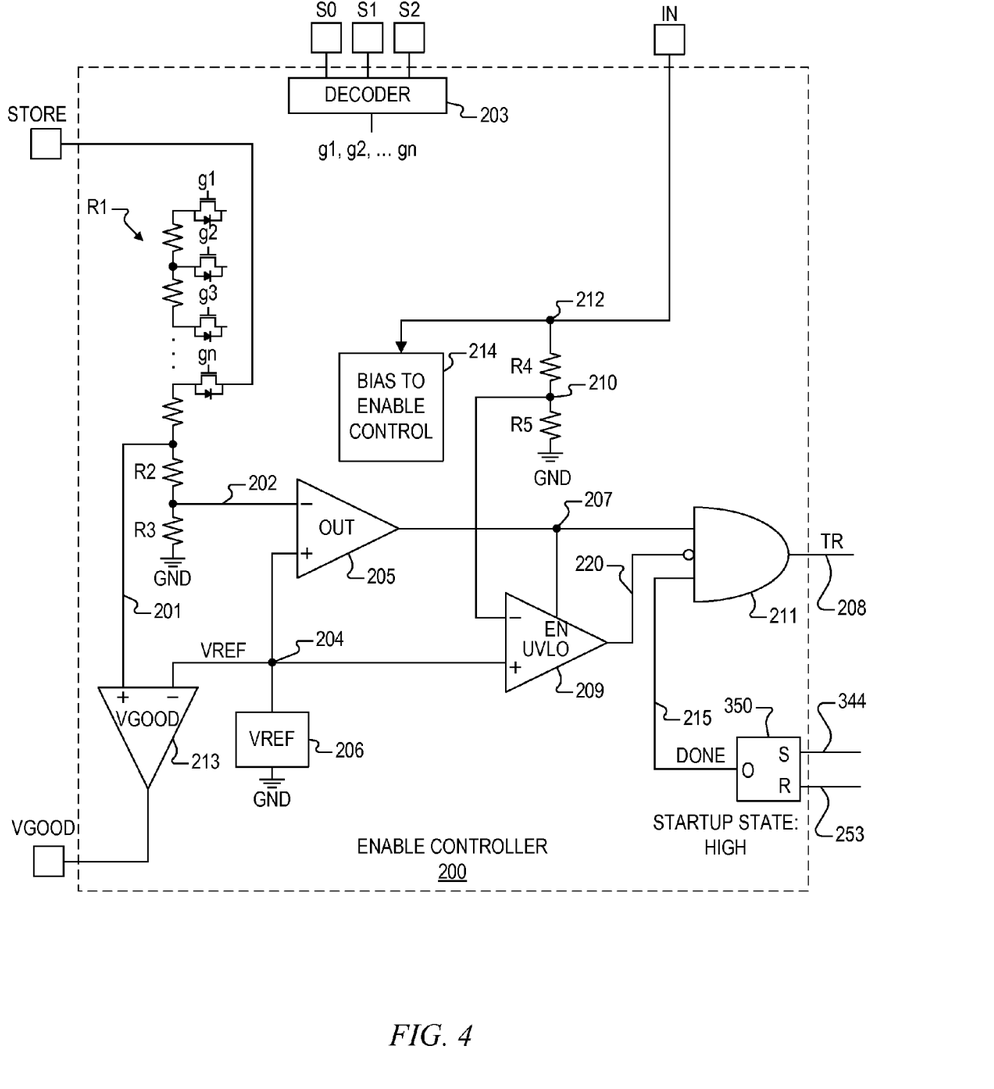
FIG. 4 is a more detailed schematic and block diagram of the enable control circuit of FIG. 1 implemented according to another embodiment.

FIG. 4 is a more detailed schematic and block diagram of the enable controller 200 implemented according to another embodiment. Similar components as the embodiment shown in FIG. 2 assume the same reference numbers. In this case, the resistor R1 is sub-divided or otherwise includes multiple resistors coupled in parallel and a corresponding multiple number of switches having current terminals coupled between a corresponding one of multiple R1 resistor junctions and the STORE terminal. The decoder 203 converts a digital or binary value asserted on the S0-S2 terminals into a set of control values g1 . . . gn, each provided to a corresponding one of the switches. In one embodiment, "n" is 8 (=$2^3$) for the three external digital values S0-S2, so that only one of the control values g1-gn is asserted at any given time. The corresponding switch is turned on to select a resistor node coupled to STORE to select a corresponding resistance.

The remaining portion of the enable controller 200 is substantially the same. In this case, a set-reset (S-R) latch or flip-flop (FF) 350 is included having an output providing the DONE signal to an input of the AND gate 211. The set and reset inputs of the SRFF 350 are provided by the switching controller 250 further described herein on corresponding nodes 344 and 253. The enable controller 200 shown in FIG. 4 operates in substantially similar manner as previously described. The SRFF 350 starts up in a high state to allow switching operation to be initiated.

Figure 5:
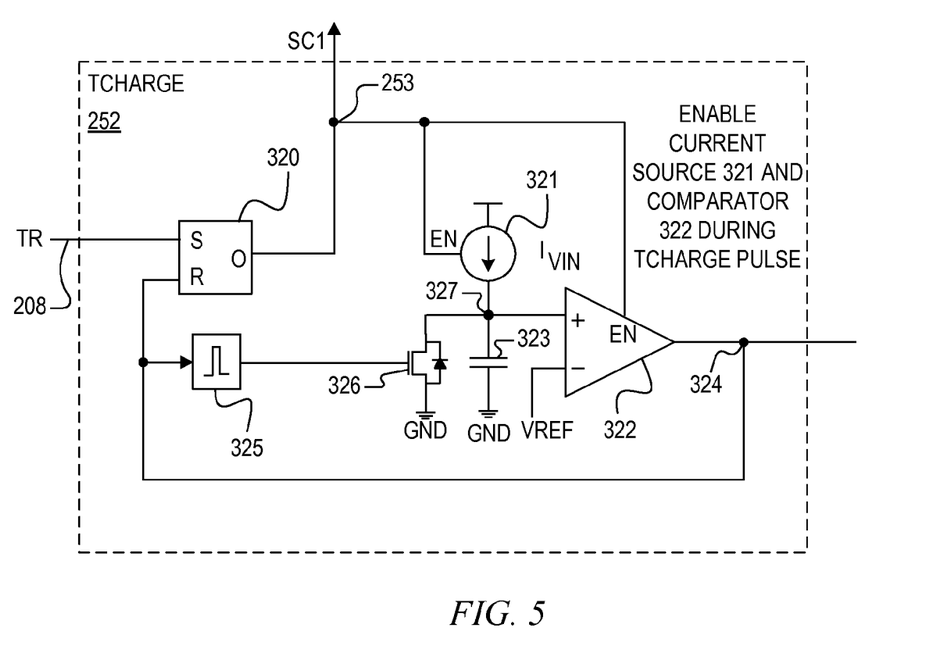
FIG. 5 is a more detailed schematic and block diagram of the TCHARGE pulse generator of FIG. 3 implemented according to one embodiment.

FIG. 5 is a more detailed schematic and block diagram of the TCHARGE pulse generator 252 implemented according to one embodiment. The TR signal is provided to the set input of another SRFF 320 provided within the TCHARGE pulse generator 252. An output of the SRFF 320 is coupled to node 253 asserting the SC1 signal, which is provided to the reset input of the SRFF 350 (FIG. 4). A current source 321 has an output coupled to a node 327 and an enable input coupled to node 253, and a capacitor 323 is coupled between node 327 and ground. The current source 321 develops a current $I_{VIN}$, which has a current level proportional with the input voltage VIN. A switch 326 has current terminals coupled between node 327 and ground. A comparator 322 has a positive input coupled to node 327, a negative input receiving VREF, an enable input coupled to node 253, and an output coupled to a node 324 provided to the reset input of the SRFF 320 and to the input of a capacitor discharge pulse generator 325. The output of the capacitor discharge pulse generator 325 is coupled to the control input of the switch 326. A $t_{CHARGE}$ pulse on node 253 enables the current source 321 and the comparator 322 when asserted high.

Figure 6:
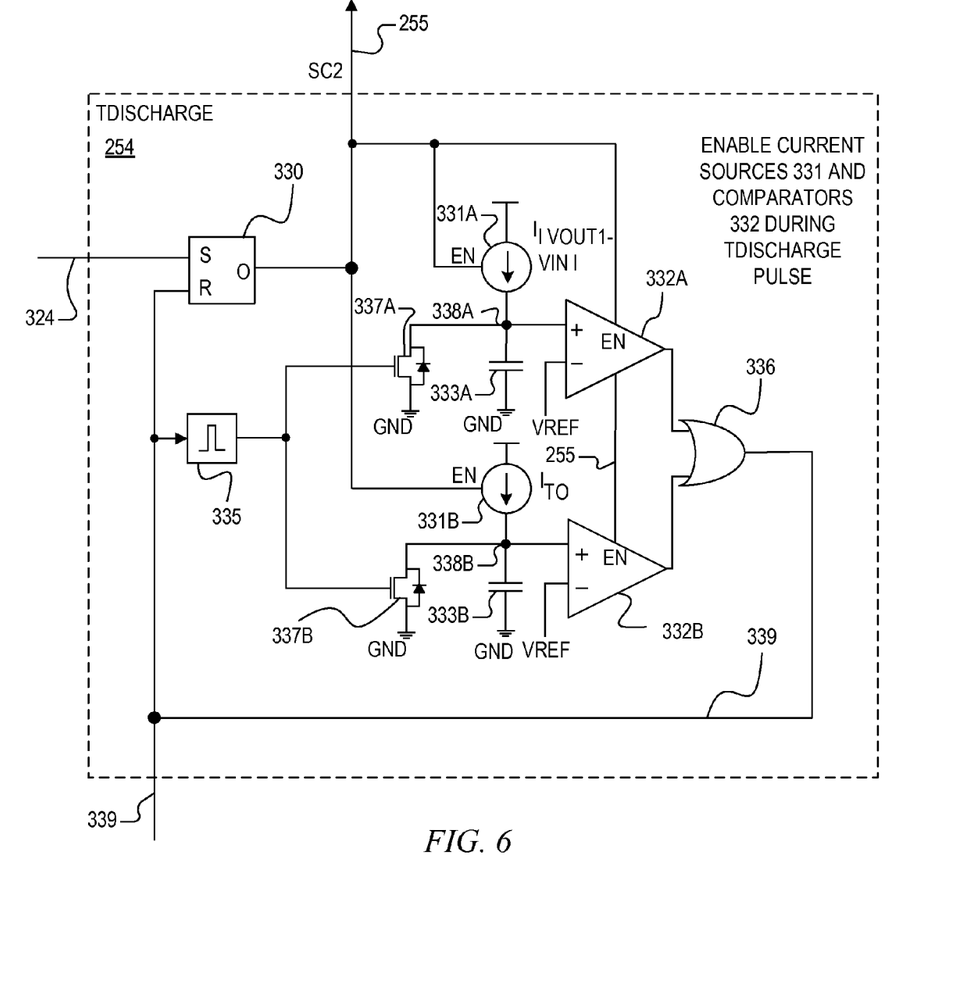
FIG. 6 is a more detailed schematic and block diagram of the TDISCHARGE pulse generator of FIG. 3 implemented according to one embodiment.

FIG. 6 is a more detailed schematic and block diagram of the TDISCHARGE pulse generator 254 implemented according to one embodiment. Node 324 is provided to the set input of another SRFF 330 provided within the TDISCHARGE pulse generator 254. An output of the SRFF 330 is coupled to node 255 asserting the SC2 signal, which is provided to enable inputs of current sources 331A and 331B and to enable inputs of comparators 332A and 332B. A $t_{DISCHARGE}$ pulse on node 255 enables the current sources 331A and 331B and the comparators 332A and 332B when asserted high. The current source 331A has an output coupled to a node 338A, and a capacitor 333A is coupled between node 338A and ground. The current source 331A develops a current $I_{|VOUT1-VIN|}$, which has a current level proportional to the absolute value of the difference between the output voltage VOUT1 and the input voltage VIN. The current source 331B develops a current $I_{TO}$, which performs a timeout function as further described below. A switch 337A has current terminals coupled between node 338A and ground. The comparator 332A has a positive input coupled to node 338A, a negative input receiving VREF, and an output coupled to one input of an OR gate 336.

The current source 331B has an output coupled to a node 338B, and a capacitor 333B is coupled between node 338B and ground. A switch 337B has current terminals coupled between node 338B and ground. The comparator 332B has a positive input coupled to node 338B, a negative input receiving VREF, and an output coupled to the other input of the OR gate 336. The output of the OR gate 336 is coupled to a node 339, which is further coupled to the reset input of the SRFF 330 and to the input of a capacitor discharge pulse generator 335. The output of the capacitor discharge pulse generator 335 is coupled to the control inputs of switches 337A and 337B.

Figure 7:
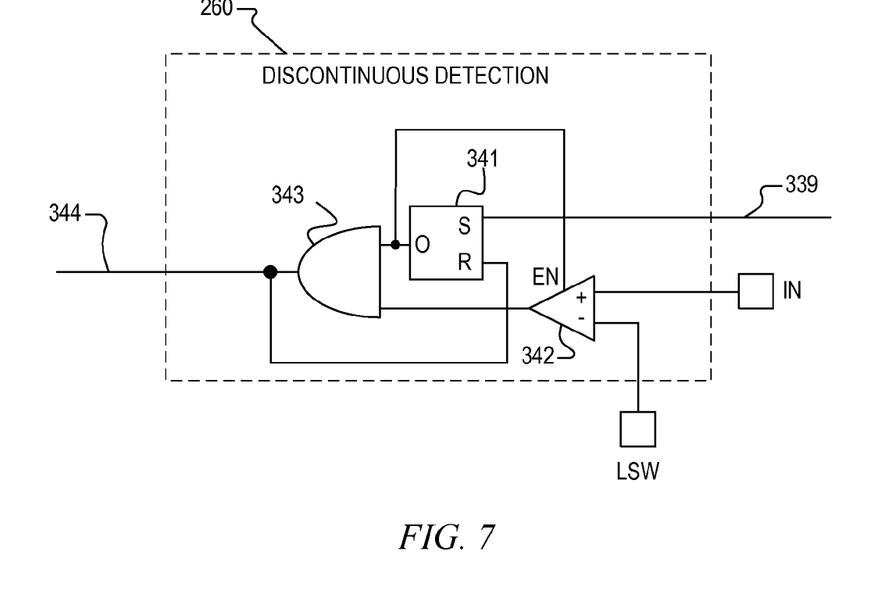
FIG. 7 is a schematic and block diagram of the discontinuous detection block of FIG. 2 implemented according to another embodiment.

FIG. 7 is a schematic and block diagram of the discontinuous detection circuit 260 implemented according to another embodiment. Node 339 at the output of the OR gate 336 is further coupled to the set input of an SRFF 341 within the discontinuous detection circuit 260. The output of the SRFF 341 is coupled to one input of an AND gate 343 and to an enable input of a comparator 342. The comparator 342 has a positive input coupled to IN (or STORE), a negative input coupled to LSW, and an output coupled to the other input of the AND gate 343. The output of the AND gate 343 is coupled to a node 344, which is further coupled to the reset input of the SRFF 341, to the set input of the SRFF 350, and to an input of the BIAS block 270 (instead of node 215 for sensing assertion of DONE).

In operation of the switching controller 250 using the TCHARGE pulse generator 252 of FIG. 5, the TDISCHARGE pulse generator 254 of FIG. 6, and the discontinuous detection circuit 260 of FIG. 7, when TR goes high, the SRFF 320 is set to enable the TCHARGE pulse generator 252 and to initiate a $t_{CHARGE}$ pulse on SC1. SC1 going high enables the current source 321 and the comparator 322. The current source 321 charges the capacitor 323 generating a positive ramp signal on node 327. When the voltage of node 327 ramps up to the voltage level of VREF, the comparator 322 switches pulling node 324 high to effectively reset the TCHARGE pulse generator 252. Node 324 going high causes the capacitor discharge pulse generator 325 to assert a pulse on the control input of the switch 326, which momentarily closes to discharge the capacitor 323, and then the switch 326 is turned back off or opened. Node 324 going high also resets the SRFF 320, which terminates the pulse on SC1 by pulling it back low. SC1 going low disables the current source 321 and the comparator 322.

The current source 321 and the capacitor 323 are configured to develop a desired duration of the $t_{CHARGE}$ pulse on SC1, such as according to equation (1). As noted, that current source 321 may develop a current proportional to the input voltage VIN. Although not shown, a transconductor circuit or the like may be used.

When node 324 goes high, it sets the SRFF 330 pulling node 255 high to initiate a $t_{DISCHARGE}$ pulse on SC2. SC2 going high enables the current sources 331A and 331B and the comparators 332A and 332B. The current source 331A charges the capacitor 333A generating a positive ramp signal on node 338A. When the voltage of node 338A ramps up to the voltage level of VREF, the comparator 332A switches pulling its output high, which in turn causes the OR gate 336 to pull node 339 high, which effectively resets the TDISCHARGE pulse generator 254. Node 339 going high causes the capacitor discharge pulse generator 335 to assert a pulse on the control input of the switch 337A, which momentarily closes to discharge the capacitor 333A, and then the switch 337A is turned back off or opened. Node 339 going high also resets the SRFF 330, which terminates the pulse on SC2 by pulling it back low. SC2 going low disables the current sources 331A and 331B and the comparators 332A and 332B.

The current source 331A and the capacitor 333A are configured to develop a desired duration of the $t_{DISCHARGE}$ pulse on SC2, such as according to equation (2). As noted, that current source 331A may develop a current proportional to the absolute value of the difference between the output voltage VOUT1 and the input voltage VIN. Although not shown, a summing and transconductor circuit or the like may be used.

As described above with reference to equation (1), the discharge period $T_{DISCHARGE}$ for of the switch 121 may significantly increase if VIN and VOUT1 are sufficiently close to each other. The current source 331B, the comparator 332B, the capacitor 333B and the switch 337B operate in substantially similar manner, except that the current source 331B and the capacitor 333B are configured to develop a timeout period, which ensures that the discharge time period does not exceed a predetermined time limit. If the output of the comparator 332A does not switch by the timeout period, then the current $I_{TO}$ charging the capacitor 333B causes the comparator 332B to switch to pull node 339 to terminate the pulse on SC2. In one embodiment, for example, the timeout period is approximately 20 μs. The timeout period is useful to prevent excessive current consumption when VOUT1 and VIN are nearly the same.

In an alternative embodiment, the switch 337B, the capacitor 333B, the comparator 332B, and the OR gate 336 may be eliminated where the current source 331B is placed in parallel with the current source 331A and the output of the comparator 332A is coupled directly to node 339. The current levels (and characteristics) of the current sources 331A and 331B may be adjusted accordingly to achieve similar results. The combination of the current sources provide the desired $t_{DISCHARGE}$ pulse during normal operation. If the conditions are such that the current source 331A does not provide sufficient current to terminate the pulse, the current source 331B ensures pulse termination at the desired timeout period.

When node 339 goes high, the SRFF 341 of the discontinuous detection circuit 260 is set so that the SRFF 341 asserts its output high. The output of the SRFF 341 going high enables the comparator 342 and pulls one input of the AND gate 343 high. The comparator 342 compares the voltage level of LSW with IN (or alternatively, with STORE), and when the LSW falls below IN (OR STORE), the comparator 342 asserts its output high and the AND gate 343 responsively asserts node 344 high. This resets the SRFF 341 back low which disables the comparator 342.

Node 344 going high sets the SRFF 350 pulling DONE high indicating completion of the current switching cycle. The rising edge of node 344 further indicates a turn off signal to the BIAS block 270 to turn off circuits within the switching controller 250 to conserve power.

Figure 8:
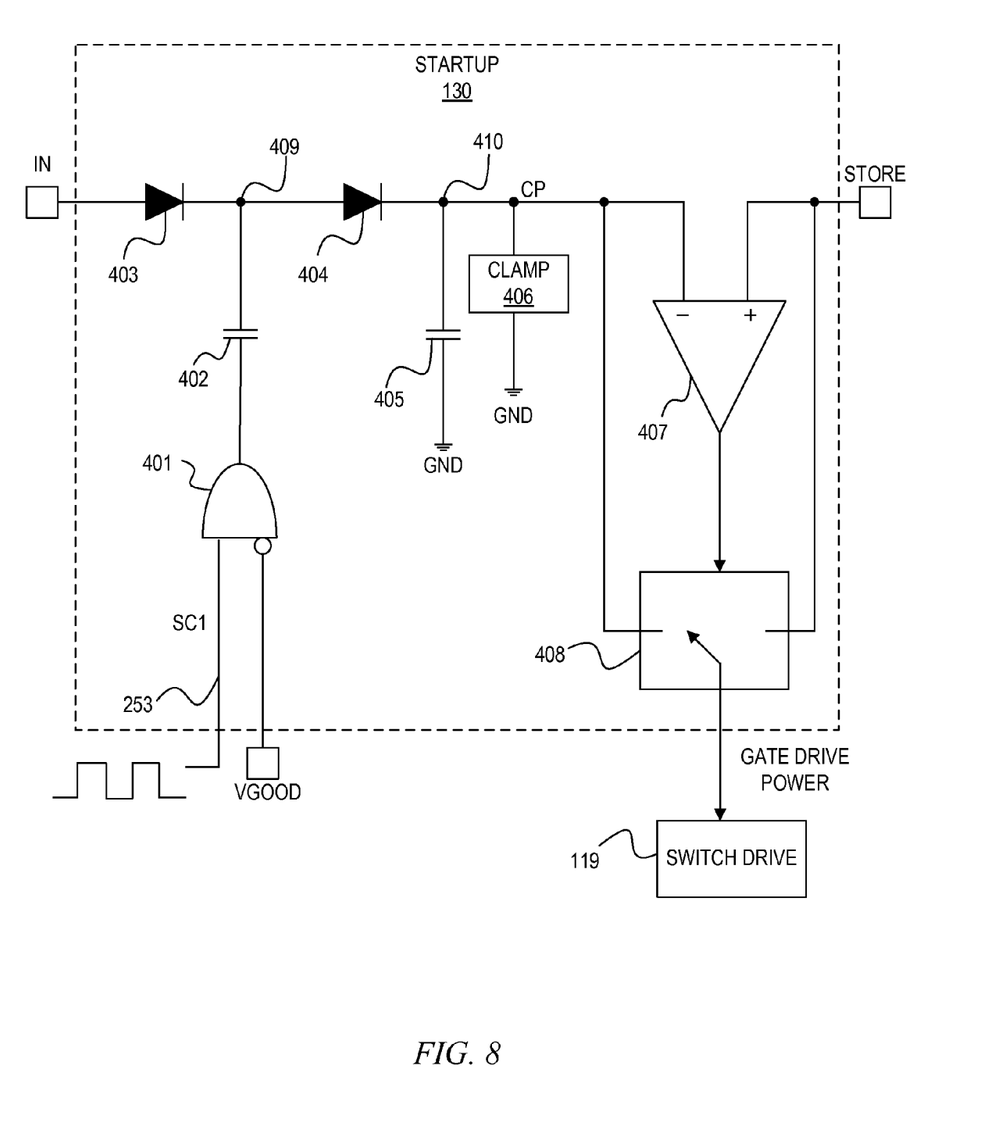
FIG. 8 is a schematic diagram of the startup circuit of FIG. 1 according to one embodiment.

FIG. 8 is a schematic diagram of the startup circuit 130 according to one embodiment. In the illustrated embodiment, the startup circuit 130 includes an AND gate 401 having one input coupled to node 253 receiving the SC1 signal and another inverted input coupled to the VGOOD terminal. The output of the AND gate 401 is coupled to one end of a "flying" capacitor 402, having its other end coupled to a node 409. The IN terminal is coupled to the anode of a diode 403, having its cathode coupled to node 409. Another diode has its anode coupled to node 409 and its cathode coupled to a node 410 developing a voltage CP. A charge pump output capacitor 405 is coupled between node 410 and ground. A clamp 406 is coupled between node 410 and ground and develops a clamp voltage. In one embodiment, the clamp circuit 406 has a clamp voltage of 2.5V for clamping CP at 2.5V.

The startup circuit 130 further includes a startup comparator 407 having one input (e.g., negative input) coupled to node 410, its other input (e.g., positive input) coupled to the STORE terminal, and its output coupled to a control input of a selector switch 408. The selector switch 408 has two select inputs coupled to node 410 and the STORE terminal.

When VGOOD is low, the capacitor 402, together with diodes 403 and 404, and the capacitor 405 form a simple charge pump doubler of the input voltage VIN at terminal IN and providing a charge pump output CP at node 410. When SC1 is low, the output of the AND gate 401 is low allowing capacitor 402 to be charged from IN. When SC1 goes high, the voltage of node 409 is pushed high to forward bias diode 404 to charge the capacitor 405. Operation proceeds in this manner to pump up the voltage of CP. The clamp 406 clamps CP to the predetermined clamp voltage (e.g., 2.5V).

The startup comparator 407 controls the selector switch 408 to choose the higher voltage level of the STORE and CP voltages to supply power to the switch driver block 119. The switch driver block 119 provides the gate drive to operate the switches 121 and 122. Thus, during startup, before the switching regulator 100 is able to regulate the voltage of VOUT1 at STORE at its target or selected voltage level (e.g., selected by decoder 203), the selector switch 408 selects node 410 so that CP supplies power to the switch driver block 119 to ensure reliable startup. Once the voltage of STORE rises above CP, the selector switch 408 switches to select VOUT1 to provide power to the switch driver block 119.

The SC1 pulse signal is shown as providing pulses to the charge pump doubler to further save circuitry and increase efficiency. Thus, the TCHARGE pulses may be used to avoid the use of a separate oscillator that consumes power. In an alternative embodiment, a low voltage oscillator may be used instead, which may be powered from VIN via IN to provide pulses to the AND gate 401 to charge CP during startup.

As previously noted, the internal circuitry of the switching regulator 100, other than the switch drive block 119, is powered from the input terminal IN rather than from the output. The BIAS block 214 receives the input voltage VIN and distributes power to each of the circuits of the enable controller 200. The BIAS block 270 receives the input voltage VIN and distributes power to the circuits of the switching controller 250 during the switching periods. The startup circuit 130 delivers power from VIN to the switch drive block 119 upon startup, and then switches to providing power from the output (STORE) to the switch drive block 119 once the output rises above a predetermined level. Once VGOOD is asserted, the startup circuit 130 is essentially turned off. The load switch 170 is only temporarily activated during assertion of the activation signal ACT for providing power to the load 132, and is then turned off.

Once the output VOUT1 is in regulation, only the output comparator 205, the reference block 206, and the feedback resistor divider R1-R3 of the enable controller 200 are enabled. In another embodiment, the VGOOD comparator 213 may also be enabled. During regulation, the switching controller 250 is turned off. The circuitry of the switching controller 250 is turned on only when VOUT1 falls below its regulated level, and then the switching controller 250 is turned on to control switching only so long as it takes to elevated VOUT1 back to regulation. Thus, overall power consumption of the switching regulator 100 is minimized as indicated by equation (5).

Figure 9:
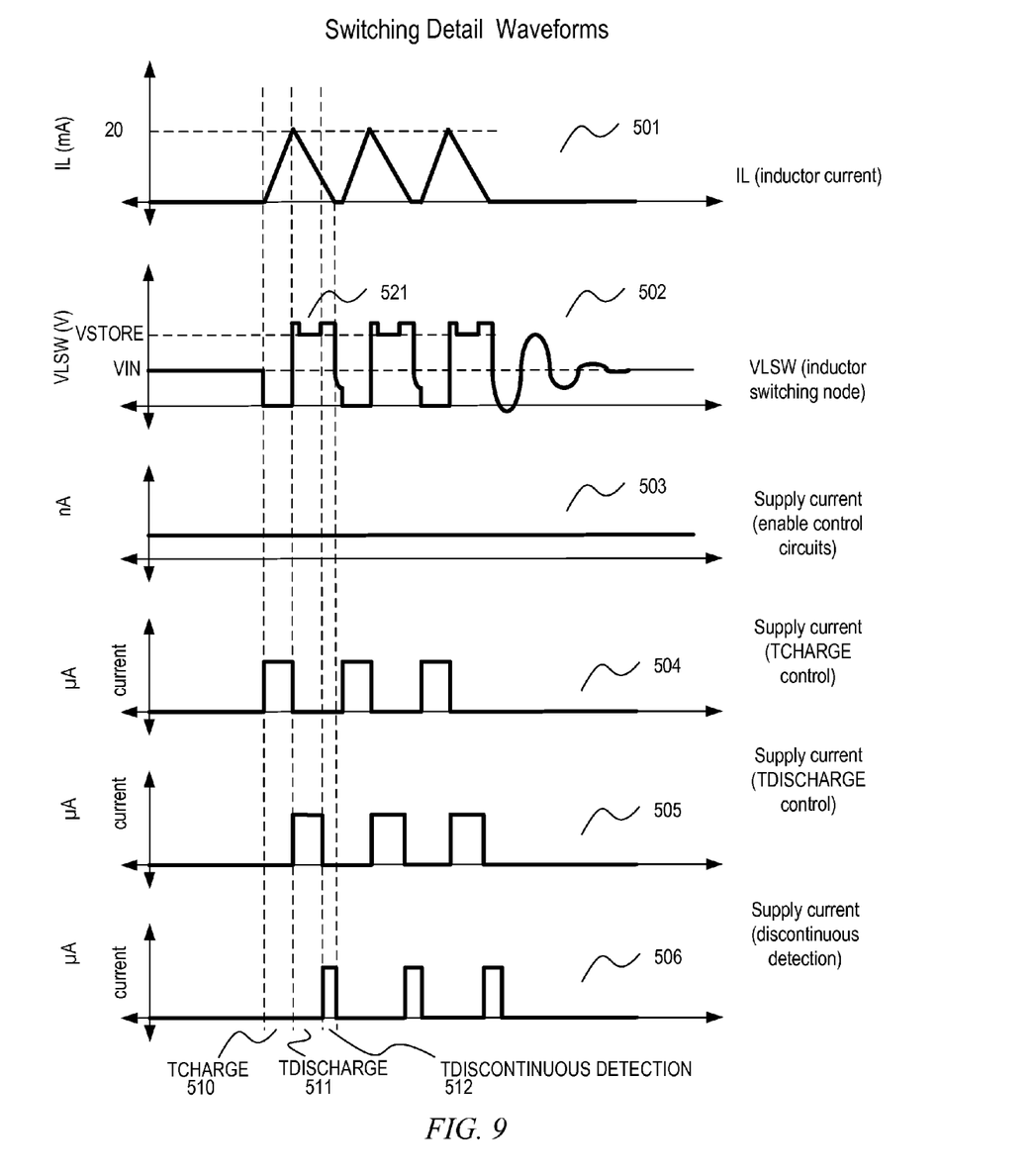
FIG. 9 shows a set of waveforms illustrating operation of the switching regulator of FIG. 1 according to one embodiment.

FIG. 9 shows a set of waveforms illustrating operation of the switching regulator 100 according to one embodiment. In this case, the inductance L of the inductor 115 is 100 µH, and K is about 2 µs*V. Plot 501 shows inductor current which ramps to 20 mA. Plot 502 shows voltage at the LSW terminal (VLSW), which begins at about VIN and then generally toggles between VSTORE and ground during switching operation. A low voltage at LSW occurs when the switch 121 has turned on. Plots 503-506 show supply currents for the various blocks during various times. Plot 503 is shown as "always on" and shows power consumption of the enable controller 200. In one embodiment, plot 503 is about 100 nano-amperes (nA). Plot 504 shows the supply current during a $t_{CHARGE}$ period 510, plot 505 shows the supply current during a $t_{DISCHARGE}$ period 511, and plot 506 shows the supply current during discontinuous detection 512 as indicated by the DONE signal. In one embodiment, the plots 504, 505 and 506 each toggle to about 10 µA.

Peaks of LSW, shown at 521, shows the delay before the switch 122 turns on and the LSW voltage is switched to VSTORE, and also the period when a $t_{DISCHARGE}$ period ends, with current still flowing in the inductor 115. As shown, VLSW voltage flies up to a voltage greater than VSTORE, typically a diode voltage greater than VSTORE due to the internal parasitic diode contained in the switch 122. During discontinuous detection, VLSW voltage collapses indicating that the inductor current has gone to zero.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A regulator controller for coupling to a voltage source, an inductor and an output capacitor, said regulator controller comprising:
   an input terminal for coupling to the voltage source and for coupling to a first end of the inductor, wherein said input terminal develops an input voltage;
   an inductor terminal for coupling to a second end of the inductor;
   at least one output terminal including a first output terminal for coupling to the output capacitor, wherein said first output terminal develops an output voltage;
   a switching circuit coupled to the input terminal and the inductor terminal, wherein said switching circuit selectively couples said inductor terminal to ground during a charging period and to said at least one output terminal during a discharging period during a switching cycle;
   a switch control circuit coupled to said switching circuit, wherein said switch control circuit sets a duration of said charging period based on said input voltage and sets duration of said discharging period based on a difference between said input voltage and said output voltage; and
   a discontinuous detection circuit that terminates said switching cycle upon detection of a condition indicative of zero current through the inductor, wherein said condition indicative of zero current through the inductor comprises a voltage of said inductor terminal reaching a voltage level of said input terminal.

2. The regulator controller of claim 1, further comprising:
   said at least one output terminal including a second output terminal;
   a switch having current terminals coupled between said first output terminal and said second output terminal and having a control terminal; and
   a detector coupled to said control terminal of said switch, wherein said detector controls said switch in response to an activation signal to selectively couple said first and second output terminals together.

3. The regulator controller of claim 2, further comprising an activation terminal coupled to said detector for receiving said activation signal from an external source.

4. The regulator controller of claim 1, further comprising a comparator circuit that inhibits said switch control circuit from initiating said switching cycle when said voltage level of said input terminal falls below a predetermined minimum voltage level.

5. The regulator controller of claim 4, wherein said comparator circuit incorporates a hysteresis voltage range in which said predetermined minimum voltage level is at a lower voltage end of said hysteresis voltage range, and wherein said comparator circuit re-enables said switching cycles when said voltage level of said input terminal rises to an upper voltage end of said hysteresis voltage range.

6. The regulator controller of claim 1, further comprising a comparator circuit that enables said switch control circuit to initiate said switching cycle only when said voltage level of said at least one output terminal falls below a predetermined regulation level.

7. The regulator controller of claim 1, wherein a peak input current level is determined based on selection of an inductance of the inductor for maximizing utilization of the voltage source.

8. The regulator controller of claim 7, wherein said inductance of the inductor allows for maximizing battery life when the voltage source comprises at least one battery.

9. The regulator controller of claim 1, further comprising a programmable input for programming an internal feedback voltage divider that enables selection of a regulated voltage level of said output terminal.

10. The regulator controller of claim 1, further comprising a startup controller coupled to said input terminal for converting power from said input voltage to said switching circuit upon startup, and then switching to providing power from said first output terminal when said output voltage achieves a predetermined voltage level.

11. The regulator controller of claim 1, further comprising a bias circuit coupled to said input terminal and to said switch control circuit, wherein said switch control circuit is powered solely from said input voltage.

12. The regulator controller of claim 1, wherein said charging period is inversely proportional to said input voltage.

13. A regulator controller for coupling to a voltage source, an inductor and an output capacitor, said regulator controller comprising:
an input terminal for coupling to the voltage source and for coupling to a first end of the inductor, wherein said input terminal develops an input voltage;
an inductor terminal for coupling to a second end of the inductor;
an output terminal for coupling to the output capacitor, wherein said output terminal develops an output voltage;
a switching circuit coupled to the input terminal and the inductor terminal, wherein said switching circuit selectively couples said inductor terminal to a reference node during a charging period and to said output terminal during a discharging period during a switching cycle; and
a switch control circuit coupled to said switching circuit, wherein said switch control circuit comprises:
an enable controller that provides a trigger signal to initiate said switching cycle; and
a charging generator that sets a duration of said charging period based on said input voltage and sets duration of said discharging period based on a difference between said input voltage and said output voltage, wherein said charging generator comprises a charge pulse generator that is enabled in response to said trigger signal to generate a charge pulse for said duration of said charging period, and that is then disabled to a reduced power state.

14. The regulator controller of claim 13, wherein said switch control circuit further comprises a discharge pulse generator that is enabled upon termination of said charge pulse to generate a discharge pulse for said duration of said discharging period, and that is then disabled to a reduced power state.

15. The regulator controller of claim 14, wherein said switch control circuit further comprises a discontinuous detection circuit that asserts a switching cycle done signal upon termination of said discharge pulse and upon detection of a condition indicative of zero current through the inductor.

16. The regulator controller of claim 15, further comprising a bias circuit coupled to said input terminal and to said switch control circuit, wherein said charging generator is powered solely from said input voltage, wherein said bias circuit enables said charging generator in response to assertion of said trigger signal, and wherein said bias circuit disables said charging generator to a reduced power state in response to assertion of said switching cycle done signal.

17. The regulator controller of claim 16, wherein said switching circuit comprises switch drivers that are powered solely by said output voltage.

18. The regulator controller of claim 13, wherein said enable controller comprises:
a feedback sense circuit coupled to said output terminal that provides an output sense signal indicative of a voltage level of said output voltage;
an output comparator that compares said output sense signal with a reference signal and that provides a regulation signal indicative thereof;
a feed forward sense circuit coupled to said input terminal that provides an input sense signal indicative of a voltage level of said input voltage;
an input comparator that compares said input sense signal with said reference signal and provides an under-voltage signal indicative thereof; and
a logic circuit receiving said regulation signal and said under-voltage signal and providing a trigger signal to activate said charging generator to initiate said switching cycle when said output sense signal indicates said output voltage is less than a regulation level and when said input sense signal indicates that said input voltage is greater than an under-voltage level.

19. The regulator controller of claim 18, wherein said charging generator asserts a done signal upon completion of said switching cycle, and wherein said logic circuit provides said trigger signal to activate said charging generator to initiate said switching cycle only when said done signal is asserted.

20. The regulator controller of claim 18, further comprising a bias circuit coupled to said input terminal and to said enable controller, wherein said enable controller is powered solely from said input voltage.

21. The regulator controller of claim 18, further comprising:
a reference circuit that provides said reference signal and an enable signal, wherein said reference circuit asserts said enable signal when said reference signal reaches a predetermined level;
wherein said output comparator includes an enable input receiving said enable signal, such that said output comparator is enabled only when said enable signal is asserted; and
wherein said input comparator includes an enable input coupled to said output of said output comparator, wherein said input comparator is enabled only when said regulation signal is asserted when said output voltage is below said regulation level.

22. The regulator controller of claim 18, further comprising:

a plurality of program terminals;

a decoder coupled to said plurality of program terminals and providing an output voltage control signal indicative thereof; and wherein said feedback sense circuit comprises a programmable voltage divider that is programmed by said output voltage control signal to control a regulation level of said output voltage.

23. A regulator controller for coupling to a voltage source, an inductor and an output capacitor, said regulator controller comprising:

an input terminal for coupling to the voltage source and for coupling to a first end of the inductor, wherein said input terminal develops an input voltage;

an inductor terminal for coupling to a second end of the inductor;

at least one output terminal including a first output terminal for coupling to the output capacitor, wherein said first output terminal develops an output voltage;

a switching circuit coupled to the input terminal and the inductor terminal, wherein said switching circuit selectively couples said inductor terminal to ground during a charging period and to said at least one output terminal during a discharging period during a switching cycle; and a switch control circuit coupled to said switching circuit, wherein said switch control circuit sets a duration of said charging period only on a constant and said input voltage, wherein said switch control circuit sets a duration of said discharging period only on said constant and a difference between said input voltage and said output voltage, and wherein said constant is determined only on a predetermined peak switching current and an inductance of the inductor.

24. The regulator controller of claim 23, further comprising:

said at least one output terminal including a second terminal for coupling to a second output capacitor, wherein said second output terminal develops a second output voltage;

a switch having current terminals coupled between said first output terminal and said second output terminal and having a control terminal; and a detector coupled to said control terminal of said switch, wherein said detector controls said switch in response to an activation signal to selectively couple said first and second output terminals together.

* * * * *